(12) United States Patent
Duan (10) Patent No.: US 11,922,012 B2
(45) Date of Patent: Mar. 5, 2024

(54) MEMORY MAPPING DEVICE AND METHOD

(71) Applicant: Micron Technology, Inc., Boise, ID (US)

(72) Inventor: Xinghui Duan, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 43 days.

(21) Appl. No.: 17/626,713

(22) PCT Filed: Sep. 10, 2019

(86) PCT No.: PCT/CN2019/105208
§ 371 (c)(1),
(2) Date: Jan. 12, 2022

(87) PCT Pub. No.: WO2021/046725
PCT Pub. Date: Mar. 18, 2021

(65) Prior Publication Data
US 2022/0382453 A1 Dec. 1, 2022

(51) Int. Cl.
*G06F 3/06* (2006.01)
(52) U.S. Cl.
CPC ............ *G06F 3/0604* (2013.01); *G06F 3/064* (2013.01); *G06F 3/0688* (2013.01)
(58) Field of Classification Search
CPC ...... G06F 3/0604; G06F 3/064; G06F 3/0688; G06F 2212/7201; G06F 12/0246; G06F 3/0658; G06F 9/4411; G06F 12/1009
See application file for complete search history.

(56) References Cited

U.S. PATENT DOCUMENTS

| | | | | |
|---|---|---|---|---|
| 8,443,167 | B1* | 5/2013 | Fallone | G06F 12/0246 |
| | | | | 711/209 |
| 8,667,248 | B1* | 3/2014 | Neppalli | G06F 12/0238 |
| | | | | 707/648 |
| 11,269,545 | B2* | 3/2022 | Yuen | G06F 3/0679 |
| 2010/0332730 | A1* | 12/2010 | Royer, Jr. | G06F 12/0246 |
| | | | | 711/E12.008 |
| 2011/0099323 | A1* | 4/2011 | Syu | G06F 12/0246 |
| | | | | 711/E12.001 |

(Continued)

FOREIGN PATENT DOCUMENTS

WO    WO-2021046725 A1    3/2021

OTHER PUBLICATIONS

"International Application Serial No. PCT/CN2019/105208, International Search Report dated Jun. 4, 2020", 4 pgs.

(Continued)

*Primary Examiner* — Francisco A Grullon
(74) *Attorney, Agent, or Firm* — Schwegman Lundberg & Woessner, P.A.

(57) ABSTRACT

Apparatus and methods are disclosed, including a sequential mapping table located within a flash memory array of a flash memory device. Selected examples include firmware in the flash memory device to load the sequential mapping table into a cache upon power and perform read and write operations using the sequential mapping table. Selected examples include firmware in the flash memory device to store an updated sequential mapping table into the flash memory array upon power down of the flash memory device.

23 Claims, 5 Drawing Sheets

(56) References Cited

U.S. PATENT DOCUMENTS

| | | | |
|---|---|---|---|
| 2011/0099325 A1* | 4/2011 | Roh | G06F 3/0679 |
| | | | 711/E12.008 |
| 2017/0075600 A1* | 3/2017 | Jung | G06F 12/0253 |
| 2017/0109042 A1 | 4/2017 | Ke | |
| 2017/0364446 A1 | 12/2017 | Pham et al. | |
| 2018/0039448 A1* | 2/2018 | Harasawa | G06F 3/0619 |
| 2018/0150238 A1* | 5/2018 | Matsuyama | G06F 3/0611 |
| 2019/0034347 A1 | 1/2019 | Haswell | |

OTHER PUBLICATIONS

"International Application Serial No. PCT/CN2019/105208, Written Opinion dated Jun. 4, 2020", 4 pgs.

* cited by examiner

|      | start LBA | start PPA | length |
|------|-----------|-----------|--------|
| MD 0 | 0         | 0         | 20     |
| MD 1 | 0x30      | 0x20      | 10     |
| MD 2 | 0x10000   | 0x300     | 2048   |
| MD 3 | 0x90      | 0x60      | 5      |

504

⇒

|      | start LBA | start PPA | length |
|------|-----------|-----------|--------|
| MD 0 | 0         | 0         | 20     |
| MD 1 | 0x30      | 0x20      | 10     |
| MD 2 | 0x10000   | 0x300     | 2048   |
| MD 3 | 0x90      | 0x60      | 5      |

|      | start LBA | start PPA | length |
|------|-----------|-----------|--------|
| MD 0 | 0         | 0         | 20     |
| MD 1 | 0x30      | 0x20      | 10     |
| MD 2 | 0x10000   | 0x300     | 2048   |
| MD 3 | 0xF0      | 0x60      | 20     |

504

⇒

|      | start LBA | start PPA | length |
|------|-----------|-----------|--------|
| MD 0 | 0         | 0         | 20     |
| MD 1 | 0x30      | 0x20      | 10     |
| MD 2 | 0x10000   | 0x300     | 2048   |
| MD 3 | 0x100     | 0x200     | 2      |

|      | start LBA | start PPA | length |
|------|-----------|-----------|--------|
| MD 0 | 0         | 0         | 20     |
| MD 1 | 0x30      | 0x20      | 10     |
| MD 2 | 0x10000   | 0x300     | 2048   |
| MD 3 | 0xF0      | 0x60      | 20     |

MEMORY MAPPING DEVICE AND METHOD

PRIORITY APPLICATION

This application is a U.S. National Stage Application under 35 U.S.C. 371 from International Application No. PCT/CN2019/105208, filed 10 Sep. 2019, published as WO 2021/046725, which is incorporated herein by reference in its entirety.

Embodiments of the disclosure relates generally to mapping of logical locations to physical locations in memory; and more specifically relate to reduced size data structures for such mapping.

BACKGROUND

Memory devices are semiconductor circuits that provide electronic storage of data for a host system (e.g., a computer or other electronic device). Memory devices may be volatile or non-volatile. Volatile memory requires power to maintain data, and includes devices such as random-access memory (RAM), static random-access memory (SRAM), dynamic random-access memory (DRAM), or synchronous dynamic random-access memory (SDRAM), among others. Non-volatile memory can retain stored data when not powered, and includes devices such as flash memory, read-only memory (ROM), electrically erasable programmable ROM (EEPROM), erasable programmable ROM (EPROM), resistance variable memory, such as phase change random access memory (PCRAM), resistive random-access memory (RRAM), or magnetoresistive random access memory (MRAM), among others.

Host systems typically include a host processor, a first amount of main memory (e.g., often volatile memory, such as DRAM) to support the host processor, and one or more storage systems (e.g., often non-volatile memory, such as flash memory) that provide additional storage to retain data in addition to or separate from the main memory.

Memory is typically described and organized by logical blocks that are virtual, and physical blocks. The physical block are described by an actual physical location in a location within one or more semiconductor dies. The logical blocks are conceptual, and may be used in a software environment. In memory organizations such as this, a mapping table may be used to keep track of how a virtual block is associated with a physical block. As memory devices increase in size and complexity, it is desirable for devices and methods to improve efficiency of memory mapping tables.

Memory is typically described and organized by logical blocks that are virtual, and are correlated with physical blocks. The physical blocks are described by actual physical locations within one or more memory arrays, such as one or more semiconductor memory dies. The logical blocks are conceptual, and may be used in a software environment. In memory organizations such as this, a data structure, such as a mapping table may be used to keep track of how a virtual block is associated with a physical block. As memory devices increase in size and complexity, it is desirable for devices and methods to improve efficiency of memory mapping tables.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Many storage devices, such as flash devices, use data structures such as translation tables to map logical elements (e.g., pages or blocks) to the physical equivalents of the logical elements (such translation tables, termed "L2P tables"). Such L2P tables are often stored in the storage device, and during operation, the tables, or portions thereof are generally loaded into an internal memory of the controller. If the table size is greater than the internal memory (e.g., random access memory (RAM), such as dynamic RAM (DRAM) or static RAM (SRAM) of the controller, a portion of the table is loaded into the internal memory and the remainder of the table is stored in other storage such as main memory storage (in some examples, NAND flash memory storage). If a translation request (e.g., a logical-to-physical (L2P) mapping) is not in the internal memory, the controller replaces the internal memory portion of the table with the appropriate portion from other storage. This process can increase latencies when performing operations such as reading or writing to the storage device.

This problem is exacerbated in devices which include limited available RAM for storing a portion of the L2P table, which will commonly be a further limitation on the amount of the L2P table that can be stored. Embodiments as described herein include generation and use of a reduced size representation of all, or a portion of, an L2P table. In examples described below, when multiple sequential logical addresses correspond to multiple sequential physical addresses, the correspondence may be indicated by an initial logical address of the sequence, an initial physical address of the sequence, and the number of sequential corresponding logical and physical addresses.

For example, sequences of physical addresses (such as physical block addresses, "PBAs") that correspond to a group of sequential logical addresses (such as logical block addresses, "LBAs"), may be represented by: the PBA of an initial block of the sequence of PBAs; the LBA of an initial block of the group of sequential LBAs associated with that group of sequential LBAs; and an indicator of the number of sequential PBAs associated with the group of sequential LBAs. For purposes of the present description, in selected discussed examples below, such representations may be presented in a table, termed herein "sequential mapping table." In many examples, a sequential mapping table will also include representations of non-sequential logical and physical addresses.

Memory devices include individual memory die, which may, for example, include a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, as a "host" as discussed later herein. In such managed memory devices the controller functionality may be implemented on one or more die also incorporating a memory array, or on a separate die). In other examples, one or more memory devices may be combined with controller functionality to form a solid-stage drive (SSD) storage volume.

Embodiments of the present disclosure are described in the example of managed memory devices implementing NAND flash memory cells, termed "managed NAND" devices. These examples, however, are not limiting on the scope of the disclosure, which may be implemented in other forms of memory devices and/or with other forms of storage technology.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a Universal Flash Storage (UFS™) device, or an embedded MMC device (eMMC™), etc. For example, in the case of the above examples, UFS devices may be configured in accordance with Joint Electron Device Engineering Council (JEDEC) standards (e.g., JEDEC standard JESD223D, entitled JEDEC UFS Flash Storage 3.0, etc., and/or updates or subsequent versions to such standard. Similarly, identified eMMC devices may be configured in accordance with JEDEC standard JESD84-A51, entitled "JEDEC eMMC standard 5.1", again, and/or updates or subsequent versions to such standard.

An SSD can be used as, among other things, the main storage device of a computer, and offer advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact. Managed memory devices, for example managed NAND devices, can be used as primary or ancillary memory in various forms of electronic devices, and are commonly used in mobile devices.

Both SSDs and managed memory devices can include a number of memory devices, including a number of dies or logical units (e.g., logical unit numbers or LUNs), and can include one or more processors or other controllers performing logic functions required to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). Similarly, managed NAND devices can include one or more arrays of volatile and/or nonvolatile memory separate from the NAND storage array, and either within or separate from a controller. Both SSDs and managed NAND devices can receive commands from a host in association with memory operations, such as read or write operations to transfer data (e.g., user data and associated integrity data, such as error data and address data, etc.) between the memory devices and the host, or erase operations to erase data from the memory devices.

Figure 1:
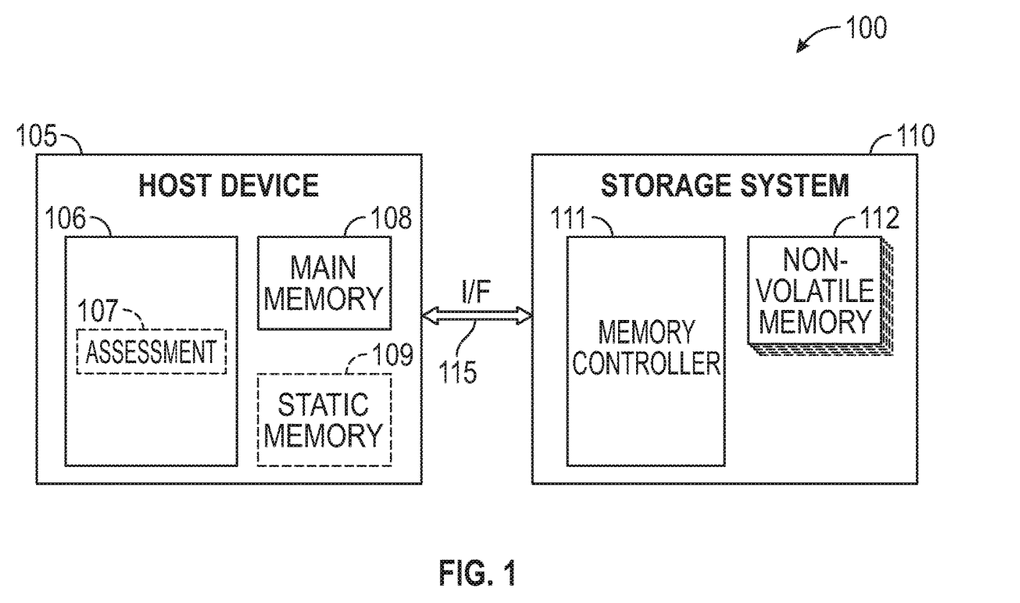
FIG. 1 illustrates an example host system including a host device and a storage system.

FIG. 1 illustrates an example system (e.g., a host system) 100 including a host device 105 and a storage system 110 configured to communicate over a communication interface (I/F) 115 (e.g., a bidirectional parallel or serial communication interface). The host device 105 can include a host processor 106 (e.g., a host central processing unit (CPU) or other processor or processing device) or other host circuitry (e.g., a memory management unit (MMU), interface circuitry, assessment circuitry 107, etc.). In certain examples, the host device 105 can include a main memory 108 (e.g., DRAM, etc.) and optionally, a static memory 109, to support operation of the host processor 106.

The storage system 110 can include a universal flash storage (UFS) device, an embedded MMC (eMMC™) device, or one or more other memory devices. For example, if the storage system 110 includes a UFS device, the communication interface 115 can include a serial bidirectional interface, such as defined in the above-indicated JEDEC UFS standard. In another example, if the storage system 110 includes an eMMC device, the communication interface 115 can include a number of parallel bidirectional data lines (e.g., DAT[7:0]) and one or more command lines, such as defined in the above-indicated JEDEC eMMC standard. In other examples, the storage system 110 can include one or more other memory devices, or the communication interface 115 can include one or more other interfaces, depending on the host device 105 and the storage system 110.

The storage system 110 can include a memory controller 111 and a non-volatile memory 112. In an example, the non-volatile memory can include a number of memory devices (e.g., dies or LUNs), such as one or more flash memory devices, etc., each including periphery circuitry thereon, and controlled by the memory controller 111.

Flash memory devices typically include one or more groups of one-transistor, floating gate memory cells. Two common types of flash memory array architectures include NAND and NOR architectures. The floating gate memory cells of the memory array are typically arranged in a matrix. The gates of each memory cell in a row of the array are coupled to an access line (e.g., a word line). In NOR architecture, the drains of each memory cell in a column of the array are coupled to a data line (e.g., a bit line). In NAND architecture, the drains of each memory cell in a column of the array are coupled together in series, source to drain, between a source line and a bit line.

Each memory cell in a NOR, NAND, 3D Cross Point, Ferroelectric RAM (FeRAM), MRAM, or one or more other architecture semiconductor memory array can be programmed individually or collectively to one or a number of programmed states. A single-level cell (SLC) can represent one bit of data per cell in one of two programmed states (e.g., 1 or 0). A multi-level cell (MLC) can represent two or more bits of data per cell in a number of programmed states (e.g., $2^n$, where n is the number of bits of data). In certain examples, MLC can refer to a memory cell that can store two bits of data in one of 4 programmed states. A triple-level cell (TLC) can represent three bits of data per cell in one of 8 programmed states. A quad-level cell (QLC) can represent four bits of data per cell in one of 16 programmed states. Unless otherwise clearly indicated by express language or context, MLC is used herein in its broader context, to refer to memory cells that can store more than one bit of data per cell (i.e., that can represent more than two programmed states)."

The storage system 110 can include a multimedia card (MMC) solid-state storage device (e.g., micro secure digital (SD) cards, etc.). MMC devices include a number of parallel interfaces (e.g., an 8-bit parallel interface) with a host device 105, and are often removable and separate components from the host device. In contrast, embedded MMC (eMMC) devices are attached to a circuit board and considered a component of the host device, with read speeds that rival serial ATA (SATA) based SSD devices. As demand for mobile device performance continues to increase, such as to fully enable virtual or augmented-reality devices, utilize increasing networks speeds, etc., storage systems have shifted from parallel to serial communication interfaces. UFS devices, including controllers and firmware, communicate with a host device using a low-voltage differential signaling (LVDS) serial interface with dedicated read/write paths, further advancing read/write speeds between a host device and a storage system.

In three-dimensional (3D) architecture semiconductor memory device technology, vertical floating gate or charge trapping storage structures can be stacked, increasing the number of tiers, physical pages, and accordingly, the density of memory cells in a memory device.

Data is often stored arbitrarily on the storage system as small units. Even if accessed as a single unit, data can be received in small, random 4-16 k single file reads (e.g., 60%-80% of operations are smaller than 16 k). It is difficult for a user and even kernel applications to indicate that data should be stored as one sequential cohesive unit. File systems are typically designed to optimize space usage, and not sequential retrieval space.

The memory controller 111 can receive instructions from the host device 105, and can communicate with the non-volatile memory 112, such as to transfer data to (e.g., write or erase) or from (e.g., read) one or more of the memory cells of the non-volatile memory array 112. The memory controller 111 can include, among other things, circuitry or firmware, such as a number of components or integrated circuits. For example, the memory controller 111 can include one or more memory control units, circuits, or components configured to control access across the memory array and to provide a translation layer between the host device 105 and the storage system 100.

The non-volatile memory array 112 (e.g., a 3D NAND architecture semiconductor memory array) can include a number of memory cells arranged in, for example, a number of devices, planes, blocks, and/or physical pages. As one example, a TLC memory device can include 18,592 bytes (B) of data per page, 1536 pages per block, 548 blocks per plane, and 4 planes per device. As another example, a two bit per cell MLC memory device can include 18,592 bytes (B) of data per page, 1024 pages per block, 548 blocks per plane, and 4 planes per device, but with half the required write time and twice the program/erase (P/E) cycles as a corresponding TLC memory device. Other examples can include other numbers or arrangements.

In operation, data is typically written to or read from the storage system 110 in pages and erased in blocks. However, one or more memory operations (e.g., read, write, erase, etc.) can be performed on larger or smaller groups of memory cells, as desired. For example, a partial update of tagged data from an offload unit can be collected during data migration or garbage collection to ensure it was re-written efficiently. The data transfer size of a memory device is typically referred to as a page, whereas the data transfer size of a host device is typically referred to as a sector. Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, an MLC NAND flash device may have a higher bit error rate than a corresponding SLC NAND flash device. As such, the MLC device may require more metadata bytes for error data than the corresponding SLC device.

Figure 2:
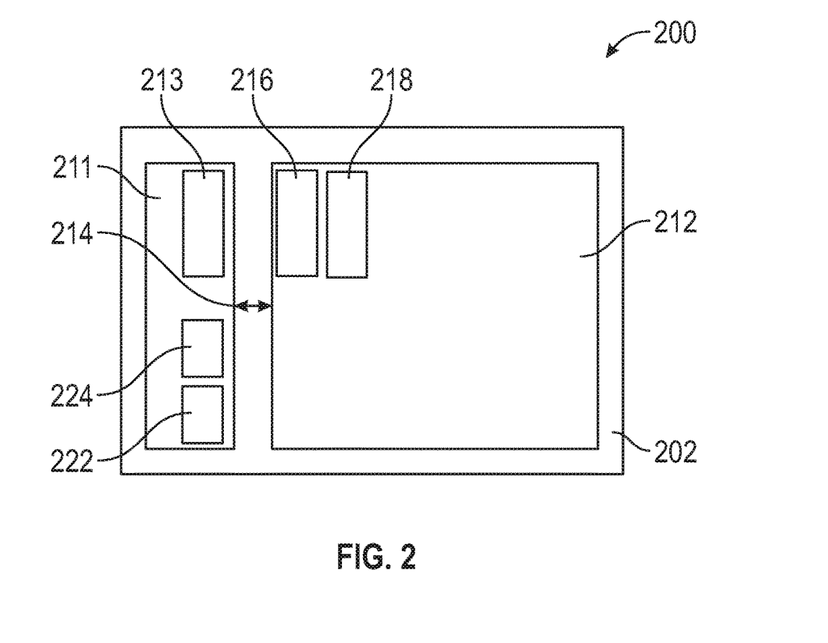
FIG. 2 illustrates a block diagram of a memory device in accordance with some example embodiments.

FIG. 2 shows a block diagram of a memory device 200 which is an example implementation of storage system 110 from FIG. 1. A controller 211 is shown coupled to a flash memory storage array 212 through interconnection 214. In the example shown, both the controller 211 and the flash memory storage array 212 are coupled to a common substrate 202. The substrate 202 may be configured to be connected to a motherboard, or other intermediate substrate in a computing device. Connections may include a socket, such as an in-line memory socket, or solder bump connections, etc.

One example of a flash memory storage array 212 includes a NAND storage array. The flash memory storage array 212 may include multiple dies to provide for increased memory storage capacity. In one example, multiple dies are stacked to reduce an amount of physical space needed for the die, although the invention is not so limited. Other examples may include dies mounted side by side on a substrate. In select examples, multiple stacks of dies may be located side by side on a substrate as part of the flash memory storage array 212. Other logical configurations apart from NAND may also be used, for example, NOR or other logical organization of memory cells.

The controller 211 is configured (e.g., hardware and/or software implementation) to perform the memory mapping methods described herein, including the exemplary methods described below with reference to FIGS. 4-6. For example, the controller 211 stores instructions for performing the memory mapping methods described herein. In the present example, the instructions are included in firmware 213. In one example, the firmware 213 is configured to interact with a sequential mapping table 216 as described in the present disclosure. In the example of FIG. 2, the sequential mapping table 216 is stored within the flash memory storage array 212.

In one example, the firmware 213 is configured to access the sequential mapping table 216. In one example, the firmware 213 is configured to write to the sequential mapping table 216. In one example, the firmware 213 is configured to create the sequential mapping table 216. In one example, the firmware 213 is configured to edit and/or modify the sequential mapping table 216. In one example, the firmware 213 is configured to also interact with an individual mapping table 218. Interaction functions of the firmware 213 and the individual mapping table 218 are similar to the sequential mapping table described above, and include accessing, writing to, creating, editing, modifying, etc.

In one example, a buffer 222 is included in the controller 211. In one example, the firmware 213 contains instructions that may be executed by a processor of the controller 211 to utilize the buffer 222 during operation to keep track of memory operations such as write operations and erase operations that alter the mapping table. At a designated time, the contents of the buffer 222 may be written to the sequential mapping table 216 to store the most up to date mapping information. More detailed examples utilizing a buffer are described in more detail below.

In one example, a cache 224 is included in the controller 211. In one example, the firmware 213 contains instructions that may be executed by a processor of the controller 211 to load the sequential mapping table 216 into the cache 224. upon start up of the memory device 200. In one example, the cache 224 is a faster form of memory, for example, static random access memory (SRAM). In one example, upon power down of the memory device 200, the sequential mapping table 216 is written back from the cache 224 into the memory storage array 212.

Figure 3:
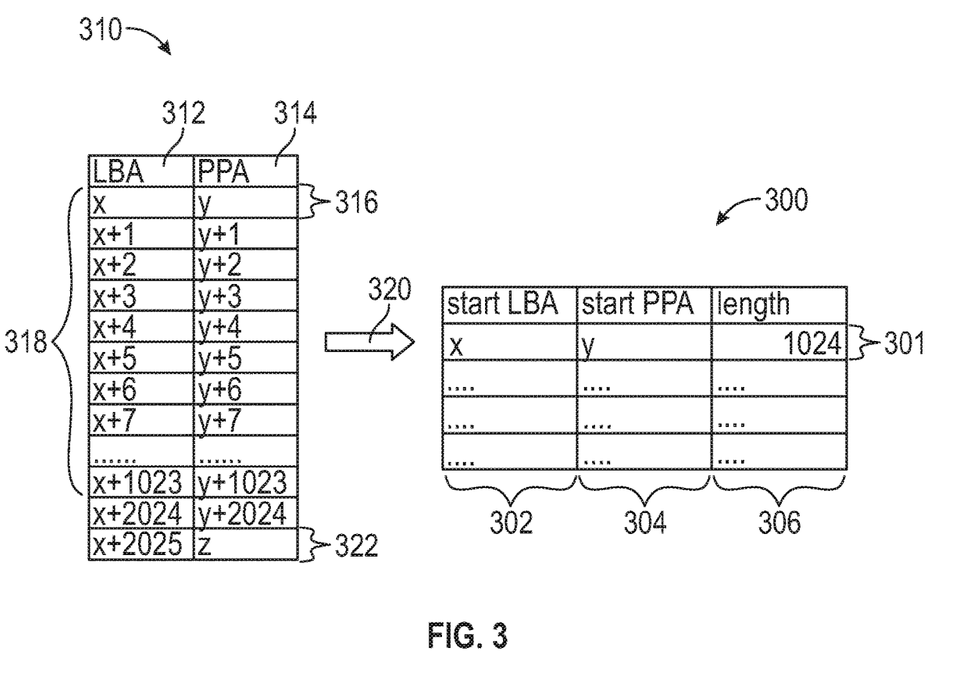
FIG. 3 illustrates a sequential mapping table in accordance with some example embodiments.

FIG. 3 shows an individual mapping table 310 and a sequential mapping table 300 as may be utilized in operating a memory device such as memory device 200 of FIG. 2. In the individual mapping table 310 a first column 312 records a logical block address (LBA) and a second column 314 records a corresponding physical address (PPA). There is a one-to-one correspondence in the individual mapping table 310 between single stored blocks in the LBA and single stored blocks in the PPA. An individual descriptor 316 maps this one-to-one relationship. Each individual descriptor includes one LBA and one PPA.

In the example shown, a sequential write operation is represented by group 318 of individual descriptors. In one example, sequential (i.e., consecutive_blocks of written data are stored in the sequential mapping table, not as a list of individual LBAs and PPAs, but with start addresses, and a length.

The sequential mapping table 300 shows a first column 302 that includes a logical block start location for a sequential write, a second column 304 that includes a corresponding physical block start location, and a length column 306 that records how many blocks long the sequential write operation is.

As can be seen from FIG. 3, the lengthy group 318 from the individual mapping table 310 is significantly reduced in size to a single sequential descriptor 301. In most memory operations, a large number of data writes will be sequential. By using a sequential mapping table as described, a size of the sequential mapping table will be significantly smaller than an individual mapping table, even though the sequential mapping table includes all the information necessary to find a desired block of data.

In some systems, a dynamic random access memory (DRAM) is located within a flash memory device. The DRAM memory is faster to access than the flash memory array. As such, a mapping table, such as individual mapping table 310, is loaded into local DRAM memory provides faster access to data stored in the flash memory array. However, DRAM memory adds cost to such systems. Accordingly, in other systems, the local DRAM memory is removed to save on manufacturing cost, and small portions of a mapping table, such as individual mapping table 310, are loaded into a small cache, such as cache 224 from FIG. 2, within a memory controller. In some examples, the size of cache 224 is limited. For example, the size of cache 224 may be such that less than the entire (e.g., a selected small portion) of the individual mapping table 310 can be loaded into cache 224 during operation. Because of the limited size of the cache, the selected small portion of the mapping table in the cache may not be the portion necessary for a given read request. In such a circumstance, the controller may request a different potion of the mapping table to be loaded from the flash memory array, then the read request may be completed. This operation of swapping the cache and reloading a portion of a mapping table takes a long time.

Using examples of a sequential mapping table such as sequential mapping table 300, as described above, larger portions, or an entire sequential mapping table may be stored in cache memory in the memory controller. The significantly reduced size of a sequential mapping table 300 is illustrated in FIG. 3, compared to individual mapping table 310. In this way, the local DRAM memory may be eliminated to save cost, and the relatively long operation of frequently swapping mapping table portions in the cache can be reduced or eliminated. In some examples, storage system 110 and/or memory device 200 do not contain DRAM.

In one example, significant amounts of data are stored in a flash memory array as sequential writes. As such, a significant amount of mapping may be stored as a sequential mapping table as described in examples above. In some examples, some remaining writes are still individual writes. In one example, an individual mapping table is also included in addition to a sequential mapping table to account for remaining non-sequential writes. In examples with both a sequential mapping table and an individual mapping table, the size of a cache needed to hold a given amount of mapping table or tables is reduced due to the reduced size of the sequential mapping table as described above.

Figure 4:
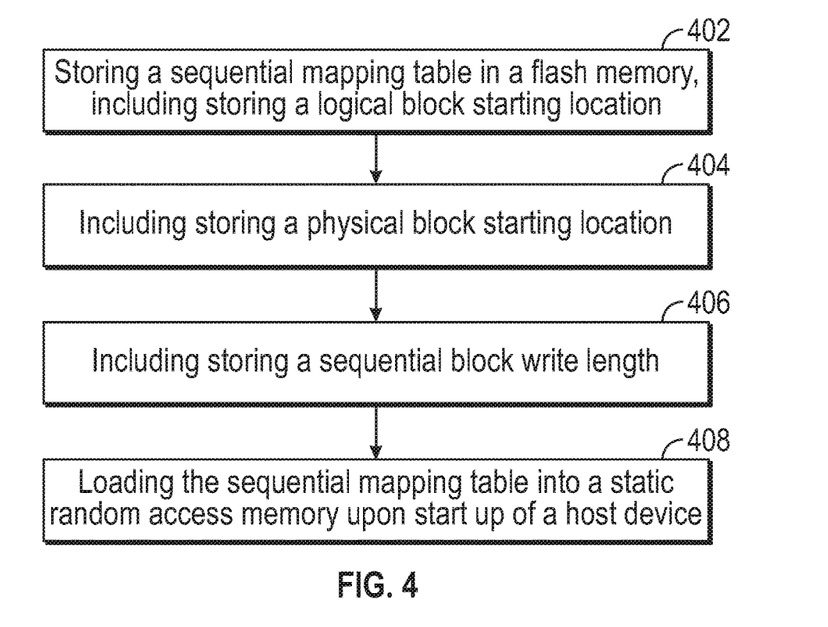
FIG. 4 illustrates an example method flow diagram in accordance with some example embodiments.

FIG. 4 shows a method of operation of a memory device according to one example. The method of FIG. 4 may be performed, for example, by a memory device, such as system 110 or memory device 200, described above, and in some examples may be implemented to create and use a sequential mapping table is represented at 216 in memory device 200, in which in some examples can be in a formed generally as indicated at 300 in FIG. 3. In operation 402, a sequential mapping table (e.g., sequential mapping table 216) is stored in a flash memory (e.g., flash memory storage array 212) of a memory device (e.g., system 110 or device 200). The sequential mapping table is stored to include a logical block starting location. In operation 404, the sequential mapping table is stored to include a physical block starting location. In operation 406, the sequential mapping table is stored to include a sequential block write length. In operation 408, the sequential mapping table is loaded into a controller cache (e.g., cache 224) upon start up of the memory device.

In one example, the sequential mapping table is initially generated (e.g., at the time the memory device is manufactured) with all zeros stored in the mapping fields. In operation, firmware in the memory controller contains instructions that may be executed by a processor of the controller to create entries to the sequential mapping table as sequential writes are performed during operation of a system. In one example upon power up, the sequential mapping table is loaded from the flash memory array into cache located within the memory controller. For example, most of or all of the sequential mapping table is loaded into the cache. The cache is then able to quickly access locations within the flash memory array, because all or most of the sequential mapping table fit into the cache.

During operation, new writes may be performed by the memory controller. If a new write is a sequential write, the memory controller may check to see how long the sequential write is. In one example, the memory controller will then check the sequential mapping table to see how long the new write is compared to other sequential writes in the sequential mapping table. In one example, the new write will be added to the sequential mapping table only if the new write is greater than or equal in length to a shortest existing entry in the sequential mapping table. When the memory device is powered down, the sequential mapping table (e.g., with the most recent added/updated entries) is saved from the cache to the flash memory storage array (e.g., flash memory storage array 212). Upon subsequent powering up of the memory device, the most recently stored sequential mapping table is loaded to the cache from the flash memory storage array.

In one example of a read operation, the memory controller will first check the sequential mapping table to see if the requested data is within a range of one of the entries in the sequential mapping table. If the requested data is determined to be included in one of the entries of the sequential mapping table, then the data will be retrieved according to the mapping entry. In one example, if the requested data is determined not to be included in one of the entries of the sequential mapping table, then an individual mapping table may be searched. If an additional entry from an individual mapping table is needed, the memory controller may call a portion of an individual mapping table from the flash memory array and complete the data read operation once the location within the flash memory array is determined. Although some individual mapping table searches may still be required, because many data writes are sequential, using a sequential mapping table as described greatly reduces a time needed for retrieving most requested data.

Although such a situation is not common, in one example, if an unexpected power loss occurs during operation, the memory controller may reset the sequential mapping table to all zeros. This prevents the corruption of the sequential mapping table because in an unexpected power loss, the memory controller has not been able to store an updated sequential mapping table in the flash memory array before power down.

Figure 5A:
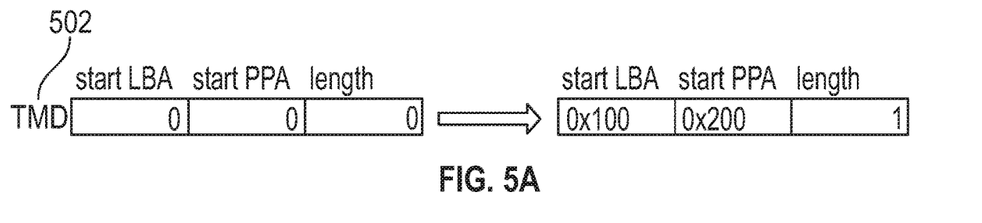
FIG. 5A-5F illustrates a series of example sequential mapping table operations in accordance with some example embodiments.

FIGS. 5A-5F illustrate example operations of sequential mapping tables as described above. In FIG. 5A, a temporary mapping descriptor (TMD) 502 is initialized as all zeros upon start up. A write is performed, and then a 0x100 LBA is recorded in the TMD 502, with a corresponding PPA of 0x200.

Figure 5B:
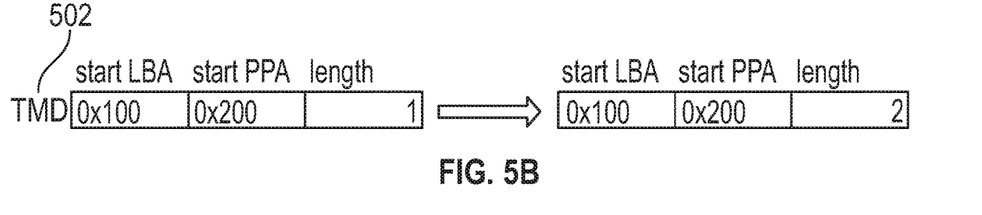

In FIG. 5B, another LBA of 0x101 is written as a sequential write and a PPA 0x201 is correspondingly written. The TMD is updated from a length of "1" to a length of "2."

Figure 5C:
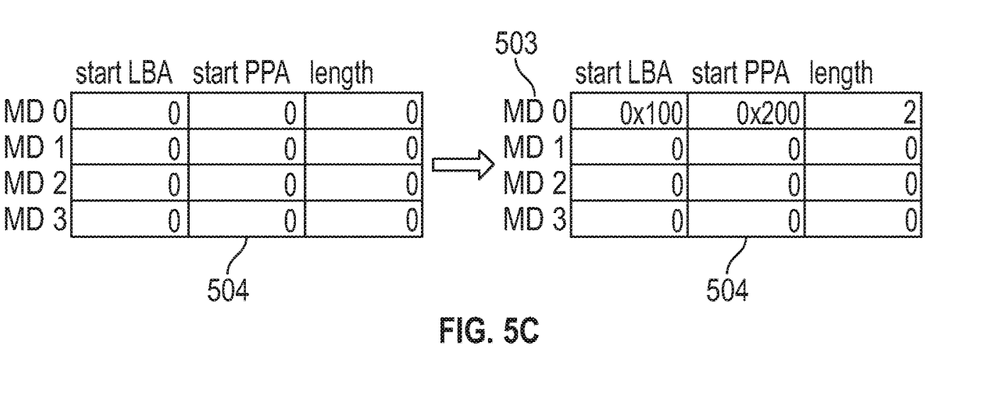

In FIG. 5C, another write is performed for LBA 0x90 and PPA 0x202. Because this write is not sequential, it is not written into the temporary mapping descriptor (TMD). In FIG. 5C, an example sequential mapping table 504 is initialized as all zeros, and the TMD from FIGS. 5A and 5B is written to a mapping descriptor 503 in the sequential mapping table 504. The sequential mapping table 504 of FIGS. 5C-5F is shown having only four mapping descriptors (MD) for ease of illustration. In practice larger sequential mapping tables 504 may be used. In FIG. 5C, because the sequential mapping tables 504 is initialized to zeros, the TMD data is entered into the first MD slot MD0.

Figure 5D:
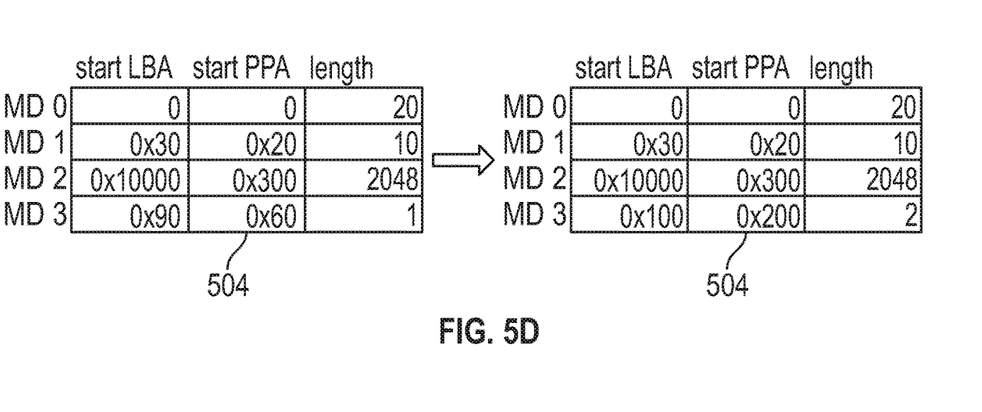

FIG. 5D shows the sequential mapping table 504 in a different state, where all four example mapping descriptors 503 are filled. In the example of FIG. 5D, if the TMD from FIG. 5B is written to the sequential mapping table 504, the table 504 is first checked to see if there is any overlap between the TMD to be written and the existing MDs 503. In FIG. 5D, there is no overlap, so the TMD of 0x100, 0x200, 2 is written to MD3. The previous MD3 entry 0x90, 0x60, 1 is overwritten, because its length is "1" and the new TMD length is "2". In this way, only the highest volume entries are stored in the sequential mapping table 504, and lower volume entries are overwritten. Mapping for lower volume entries may remain stored in conventional tables and can be accessed without using the sequential mapping table 504.

Figure 5E:
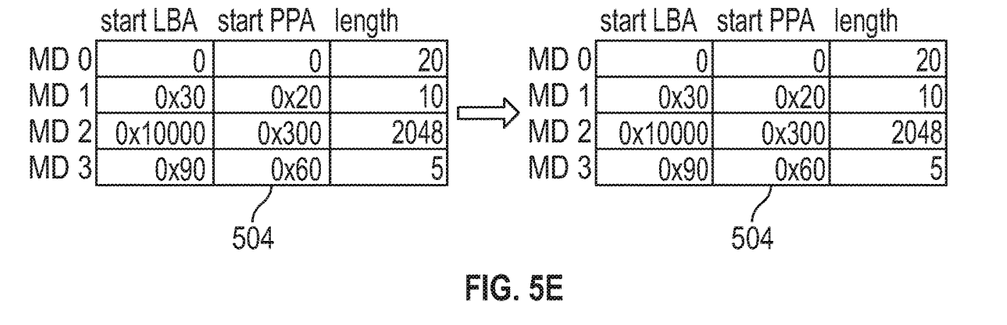

FIG. 5E shows an example sequential mapping table 504 where the proposed TMD of 0x100, 0x200, 2 is shorter than all four MDs 503 in the sequential mapping table 504. In one example, to maximize efficiency of the sequential mapping table 504, the entry TMD of 0x100, 0x200, 2 will not be added to the sequential mapping table 504, because it is already full of longer sequential entries.

Figure 5F:
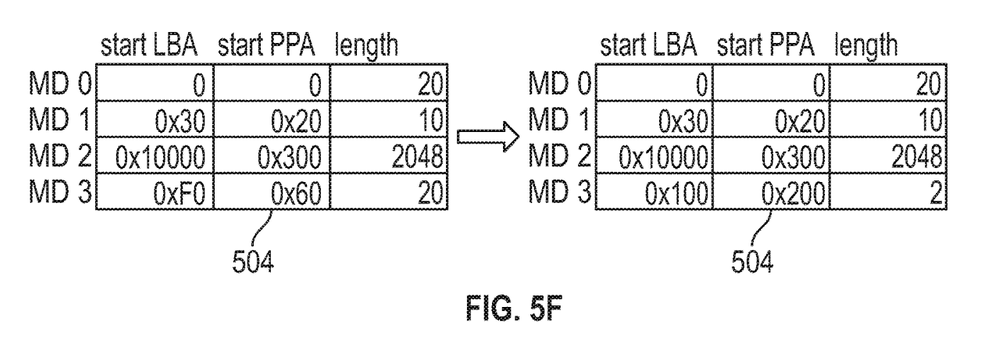

FIG. 5F shows an example sequential mapping table 504 where the proposed TMD of 0x100, 0x200, 2 overlaps the existing MD3 of 0xF0, 0x104, 20. In this case, the TMD is overwritten on the MD3.

Figure 6:
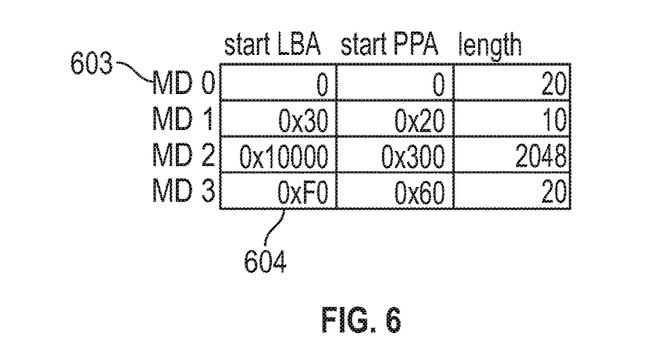
FIG. 6 illustrates an example sequential mapping table in accordance with some example embodiments.

FIG. 6 shows an example sequential mapping table 604. In the example of FIG. 6, a read request is looking for an LBA of 0x35 in sequential mapping table 604. Based on MD1, it is determined that the LBA of 0x35 within a range of LBA (0x30, 0x3a) corresponding to MD1. In this example, the corresponding PPA of 0x25 is determined from the sequential mapping table 604 based on MD1.

Figure 7:
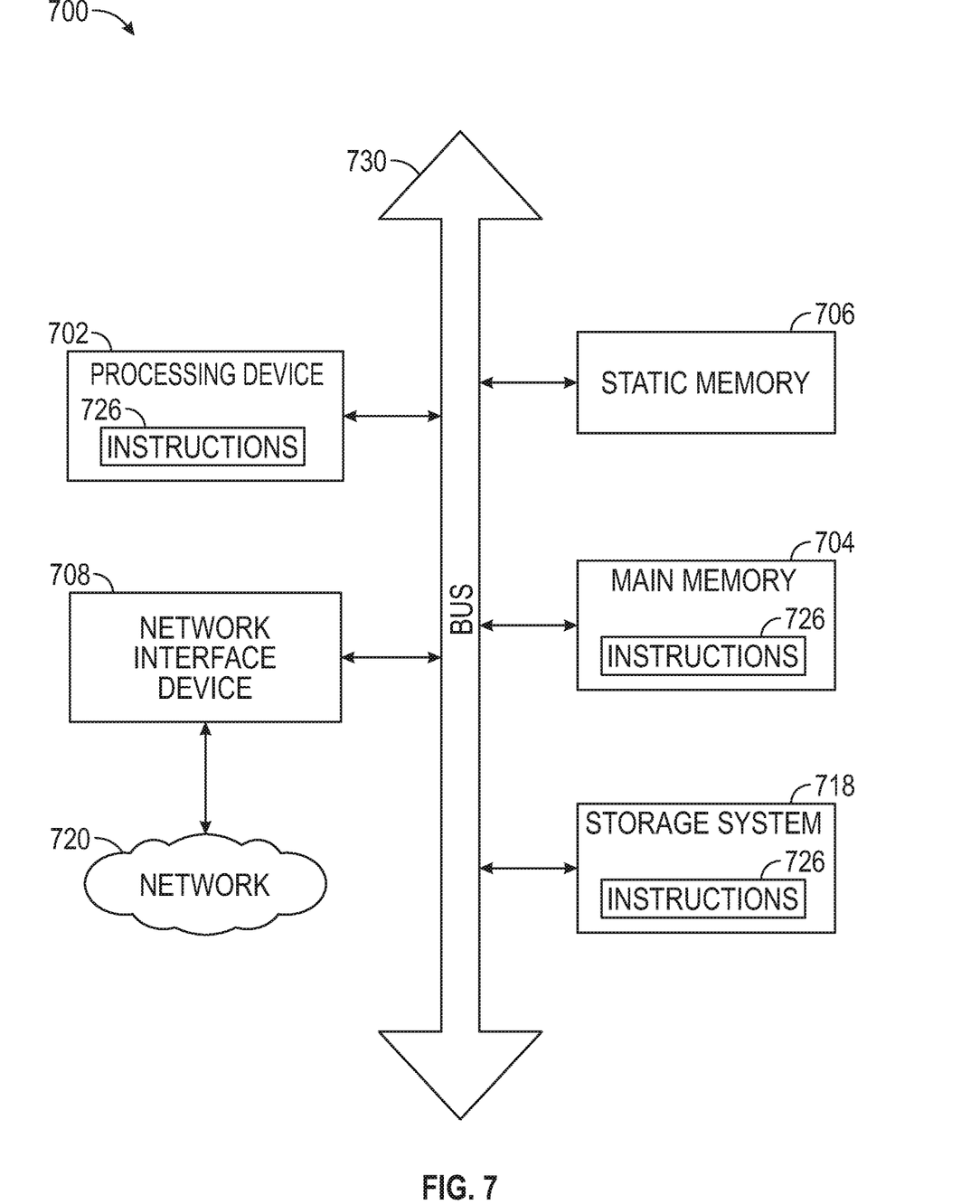
FIG. 7 illustrates an example block diagram of an information handling system in accordance with some example embodiments.

FIG. 7 illustrates a block diagram of an example machine 700 that may include a memory device or system as described in examples above. The machine 700 may include a memory device that includes firmware that contains instructions that when executed by a processor of the controller create and/or interact with a sequential mapping table as described above As described above relative to FIGS. 3 and 5A-F. The machine 700 may perform a method utilizing a sequential mapping table as described above.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system, a host system, etc.) 700 may include a processing device 702 (e.g., a hardware processor, a central processing unit (CPU), a graphics processing unit (GPU), a hardware processor core, or any combination thereof, etc.), a main memory 704 (e.g., read-only memory (ROM), dynamic random-access memory (DRAM) such as synchronous DRAM (SDRAM) or Rambus DRAM (RDRAM), etc.), a static memory 706 (e.g., static random-access memory (SRAM), etc.), and a storage system 718, some or all of which may communicate with each other via a communication interface (e.g., a bus) 730.

The processing device 702 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 can be configured to execute instructions 726 for performing the operations and steps discussed herein. The computer system 700 can further include a network interface device 708 to communicate over a network 720.

The storage system 718 can include a machine-readable storage medium (also known as a computer-readable medium) on which is stored one or more sets of instructions 726 or software embodying any one or more of the methodologies or functions described herein. The instructions 726 can also reside, completely or at least partially, within the main memory 704 or within the processing device 702 during execution thereof by the computer system 700, the main memory 704 and the processing device 702 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 700 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 700 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 726 (e.g., software, programs, an operating system (OS), etc.) or other data are stored on the storage system 718 can be accessed by the main memory 704 for use by the processing device 702. The main memory 704 (e.g., DRAM) is typically fast, but volatile, and thus a different type of storage than the storage system 718 (e.g., an SSD), which is suitable for long-term storage, including while in an "off" condition. The instructions 726 or data in use by a user or the machine 700 are typically loaded in the main memory 704 for use by the processing device 702. When the main memory 704 is full, virtual space from the storage system 718 can be allocated to supplement the main memory 704; however, because the storage system 718 device is typically slower than the main memory 704, and write speeds are typically at least twice as slow as read speeds, use of virtual memory can greatly reduce user experience due to storage system latency (in contrast to the main memory 704, e.g., DRAM). Further, use of the storage system 718 for virtual memory can greatly reduce the usable lifespan of the storage system 718.

The instructions 724 may further be transmitted or received over a network 720 using a transmission medium via the network interface device 708 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 708 may include one or more physical jacks (e.g., Ethernet, coaxial, or phone jacks) or one or more antennas to connect to the network 720. In an example, the network interface device 708 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (i.e., the memory cell may be programmed to an erased state).

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

To better illustrate the method and apparatuses disclosed herein, a non-limiting list of embodiments is provided here:

Example 1 is a memory device. The memory device include at least one flash memory storage array. The memory device includes a sequential mapping table stored within the flash memory storage array, wherein the sequential mapping table includes sequential write entries where a number of sequential write entries is greater than one, the sequential mapping table including data fields for a logical block start location, a physical block start location, and a sequential block write length.

In Example 2, the subject matter of Example 1 is optionally configured to further include an individual mapping table.

In Example 3, the subject matter of any of Examples 1-2 is optionally configured such that the flash memory storage array includes a NAND storage array.

In Example 4, the subject matter of any of Examples 1-3 is optionally configured to further include a controller within the memory device, the controller including firmware to update the sequential mapping table from a host device upon power down of the host device.

In Example 5, the subject matter of any of Examples 1-4 is optionally configured to further include a controller within the memory device, the controller including firmware to reset the sequential mapping table to all zeros upon an unexpected power loss.

Example 6 is a system. The system includes a host device, including a processor, and a flash memory device coupled to the host device. The flash memory device includes at least one flash memory storage array, and a sequential mapping table stored within the flash memory storage array, wherein the sequential mapping table includes sequential write entries where a number of sequential write entries is greater than one, the sequential mapping table including data fields for a logical block start location, a physical block start location, and a sequential block write length. The system includes firmware to load data from the sequential mapping table into a controller, wherein the controller is configured to interface between the flash memory device and the processor.

In Example 7, the subject matter of Example 6 is optionally configured to further include an individual mapping table located within the flash memory storage array.

In Example 8, the subject matter of any of Examples 6-7 is optionally configured such that the controller includes firmware to search for data by checking to see if wanted data is within a range of a sequential entry in the sequential mapping table, and the firmware is further configured to search the individual mapping table if the wanted data is not within a range of a sequential entry in the sequential mapping table.

In Example 9, the subject matter of any of Examples 6-8 is optionally configured such that the controller includes firmware to update the sequential mapping table during operation.

In Example 10, the subject matter of any of Examples 6-9 is optionally configured such that the controller includes firmware to only add an entry into the sequential mapping table if a new write is sequentially longer than a shortest entry in the sequential mapping table.

In Example 11, the subject matter of any of Examples 6-10 is optionally configured such that the controller includes firmware to store an updated sequential mapping table to the flash memory storage array upon power down.

In Example 12, the subject matter of any of Examples 6-11 is optionally configured such that the controller includes firmware to store all zeros to the sequential mapping table upon unexpected power loss.

Example 13 is a method. The method includes storing a sequential mapping table in a flash memory of a memory device, including storing a logical block starting location, storing a physical block start location, storing a sequential block write length, and loading the sequential mapping table into a controller cache upon start up of the memory device.

In Example 14, the subject matter of Example 13 is optionally configured such that the sequential mapping table is constructed and updated in a buffer within the controller, and stored to the flash memory upon power down of the memory device.

In Example 15, the subject matter of any of Examples 13-14 is optionally configured to further include initializing the sequential mapping table as all zeros upon manufacture.

In Example 16, the subject matter of any of Examples 13-15 is optionally configured to further include initializing the sequential mapping table as all zeros upon unexpected power loss.

In Example 17, the subject matter of any of Examples 13-16 is optionally configured to further include only adding an entry into the sequential mapping table if a new write is sequentially longer than a shortest entry in the sequential mapping table.

In Example 18, the subject matter of any of Examples 13-17 is optionally configured to further include searching for data by checking to see if the wanted data is within a range of a sequential entry in the sequential mapping table, and searching an individual mapping table if the wanted data is not within a range of a sequential entry in the sequential mapping table.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A memory device, comprising:
   at least one memory storage array comprising physical blocks of memory cells;
   a controller operable in response to instructions stored in the memory device, wherein the instructions, when executed by the controller, cause the controller to perform operations comprising:

in response to a first read request to the memory device, reading a sequential mapping table stored within the memory device, the sequential mapping table including multiple sequential write entries associating logical block addresses (LBAs) with physical block addresses (PBAs) of block of the storage array, wherein the sequential mapping table includes;
a sequential block write length indicator identifying a number of multiple sequential PBAs corresponding to a first group of sequential LBAs;
a starting PBA of the sequential PBAs; and
to only add an entry into the sequential mapping table if a new write is sequentially longer than a shortest entry in the sequential mapping table.

2. The memory device of claim 1, wherein the operations further comprise:
through reference to the sequential mapping table, identifying multiple PBAs containing multiple memory cells responsive to the first read request; and
accessing the multiple PBAs and reading electrical properties of the memory cells responsive to the first read request.

3. The memory device of claim 2, wherein memory cells within the physical blocks of memory cells are arranged in pages, and wherein reading electrical properties of the memory cells responsive to the first read request comprises reading multiple pages arranged in respective physical blocks.

4. The memory device of claim 1, wherein the operations further comprise:
reading at least a portion of a logical to physical (L2P) table stored in the memory storage array; and
generating the sequential mapping table representative of at least a portion of the L2P table.

5. The memory device of claim 1, wherein the operations further comprise:
identifying sequential writes to physical block addresses being performed in the memory device; and
generating descriptors of the sequential mapping table as writes are performed in the memory device.

6. The memory device of claim 5, wherein the operations further comprise,
storing the sequential mapping table within the memory storage array; and
writing the sequential mapping table to a cache memory of the memory device;
wherein the reading of the sequential mapping table comprises reading the sequential mapping table from the cache memory.

7. The memory device of claim 6, wherein the cache memory comprises volatile memory.

8. The memory device of claim 7, wherein the cache memory comprises SRAM.

9. The memory device of claim 1, wherein the sequential mapping table includes data fields for:
LBAs associated with the storage array;
PBAs of the storage array; and
the sequential block write length indicator.

10. The memory device of claim 1, further including an individual mapping table.

11. The memory device of claim 1, wherein the flash at least one memory storage array includes a NAND storage array.

12. The memory device of claim 1, further including a controller within the memory device, the controller including firmware to update the sequential mapping table from a host device upon power down of the host device.

13. The memory device of claim 1, further including a controller within the memory device, the controller including firmware to reset the sequential mapping table to all zeros upon an unexpected power loss.

14. A system, comprising:
a host device, including a processor;
a flash memory device coupled to the host device, wherein the flash memory device includes:
at least one flash memory storage array;
a sequential mapping table stored within the flash memory storage array, wherein the sequential mapping table includes sequential write entries where a number of sequential write entries is greater than one, the sequential mapping table including data fields for:
a logical block start location;
a physical block start location;
a sequential block write length; and
firmware to load data from the sequential mapping table into a controller wherein the controller is configured to interface between the flash memory device and the processor, and wherein the firmware is configured to only add an entry into the sequential mapping table if a new write is sequentially longer than a shortest entry in the sequential mapping table.

15. The system of claim 14, further including an individual mapping table located within the flash memory storage array.

16. The system of claim 15, wherein the controller includes firmware to search for data by checking to see if wanted data is within a range of a sequential entry in the sequential mapping table; and
wherein the firmware is further configured to search the individual mapping table if the wanted data is not within a range of a sequential entry in the sequential mapping table.

17. The system of claim 14, wherein the controller includes firmware to store an updated sequential mapping table to the flash memory storage array upon power down.

18. The system of claim 14, wherein the controller includes firmware to store all zeros to the sequential mapping table upon unexpected power loss.

19. A method, comprising:
storing a sequential mapping table in a flash memory of a memory device, including:
storing a logical block starting location;
storing a physical block start location;
storing a sequential block write length; and
loading the sequential mapping table into a controller cache upon start up of the memory device; and
only adding an entry into the sequential mapping table if a new write is sequentially longer than a shortest entry in the sequential mapping table.

20. The method of claim 19, wherein the sequential mapping table is constructed and updated in a buffer within the controller, and stored to the flash memory upon power down of the memory device.

21. The method of claim 19, further including initializing the sequential mapping table as all zeros upon manufacture.

22. The method of claim 19, further including initializing the sequential mapping table as all zeros upon unexpected power loss.

23. The method of claim 19, further including searching for data by checking to see if a wanted data is within a range of a sequential entry in the sequential mapping table; and searching an individual mapping table if the wanted data is not within a range of a sequential entry in the sequential mapping table.

\* \* \* \* \*